United States Patent
Dyer

(10) Patent No.: US 9,365,151 B2
(45) Date of Patent: Jun. 14, 2016

(54) INCREASING POINTER BRIGHTNESS TO INDICATE WARNING LEVEL

(71) Applicant: Continental Automotive Systems, Inc., Auburn Hills, MI (US)

(72) Inventor: Kevin M. Dyer, Macomb Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 34 days.

(21) Appl. No.: 14/495,305

(22) Filed: Sep. 24, 2014

(65) Prior Publication Data

US 2016/0082876 A1 Mar. 24, 2016

(51) Int. Cl.
*G02B 6/02* (2006.01)
*B60Q 1/00* (2006.01)
*G01F 23/00* (2006.01)

(52) U.S. Cl.
CPC . *B60Q 1/00* (2013.01); *G01F 23/00* (2013.01)

(58) Field of Classification Search
CPC ....................................................... B60Q 1/00
USPC ......................................... 340/438, 441, 461
See application file for complete search history.

(56) References Cited

U.S. PATENT DOCUMENTS

| | | | | |
|---|---|---|---|---|
| 5,703,612 A | * | 12/1997 | Salmon | B60K 37/02 116/286 |
| 6,441,726 B1 | * | 8/2002 | Voto | B60K 37/02 340/438 |
| 6,515,596 B2 | * | 2/2003 | Awada | G08G 1/096716 340/901 |
| 2010/0231372 A1 | * | 9/2010 | Sandstrom | B60K 35/00 340/459 |
| 2015/0168644 A1 | * | 6/2015 | Meyers | G01D 11/28 362/511 |

* cited by examiner

Primary Examiner — Brent Swarthout

(57) ABSTRACT

Vehicle instrument gauges and an instrument cluster with warning telltales each having a gauge surface area with two or more indicia on a viewing surface area. At least one of the indicia is a warning indicia with an illuminated marker positionable between the indicia. The illuminated marker has a nominal luminescence mode when positioned in an area of the viewing surface area to indicate optimal vehicle operating conditions, a range of increased luminescence mode when indicating changing vehicle operating conditions and the illuminated marker will begin to brighten as the position of the illuminated marker moves toward the warning indicia, a maximum luminescence mode when in a caution zone area and used to indicate that the vehicle operating conditions need attention soon, and flashing mode indicating that the vehicle operating conditions need immediate attention.

7 Claims, 5 Drawing Sheets

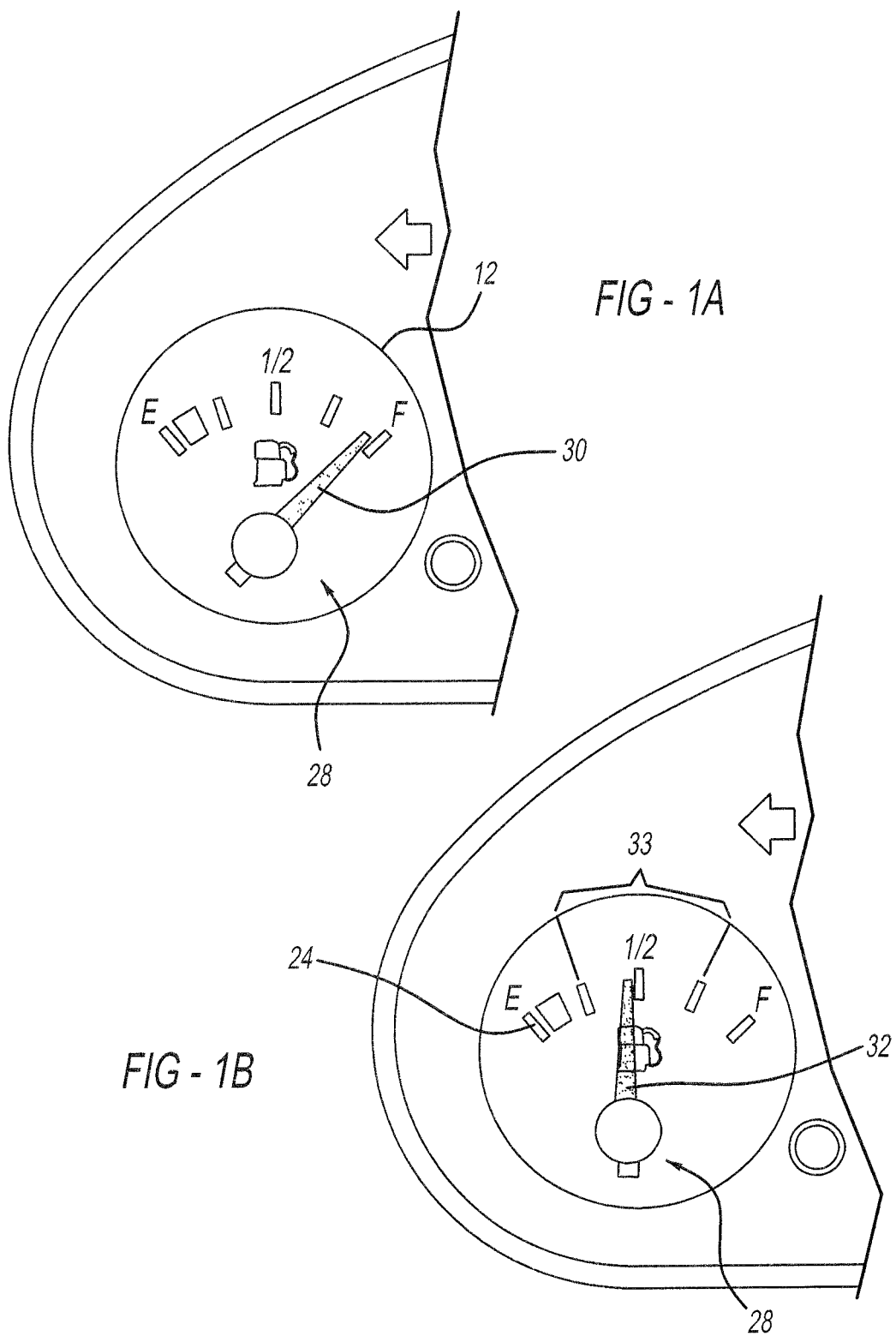

INCREASING POINTER BRIGHTNESS TO INDICATE WARNING LEVEL

FIELD OF THE INVENTION

The present invention is related to a vehicle gauge and instrument cluster providing several illuminated warning telltales.

BACKGROUND OF THE INVENTION

In the field of automotive instrumentation, instrument clusters contain many different gauges and warning lights indicating various vehicle conditions. Often times warning lights are used to indicate when certain conditions exist, which can be seen on a specific instrument gauge. For example, if a vehicle fuel gauge reaches a certain point near empty, indicating that the vehicle is coming close to running out of fuel, a low fuel indicator light is illuminated. Other indicator lights include up shift lights that illuminate when a vehicle's rotations per minute (RPMs) exceed a certain normal range for a specific gear and warn a driver to slow down or up shift to a higher gear. Other examples of indicator lights include engine temperature, oil pressure, and battery voltage warning lights that are illuminated when their respective gauges or conditions reach a certain warning or caution zone.

One problem with using various warning lights is that they are not easily noticed by a driver due to the complexity of instrument clusters. Additionally, a driver must notice the warning light and be able to decipher the symbol or what the light is indicating, which is not always obvious from a quick glance at the instrument cluster. It is therefore desirable to provide instrument clusters and instrument gauges that are easily recognizable and stand out to a driver by having a quick look at the instrument cluster.

The use of warning lights also do not always provide a driver with a feel for how detrimental the problem might be, without viewing the respective instrument gauge to which the warning light pertains. For example, a low fuel indicator light still requires a driver to look at the fuel level gauge and determine how close the gauge is to being at the empty tank indicator. It is therefore further desirable to provide instrument clusters and instrument gauges that provide the driver with more indicators that a certain issue could or may be addressed prior to the issue or problem developing to a point where a warning indication is needed.

SUMMARY OF THE INVENTION

The present invention relates to vehicle instrument gauge with warning telltales having a gauge surface area with two or more indicia on a viewing surface area. At least one of the two or more indicia is a warning indicia. There is an illuminated marker positionable between the two or more indicia on the viewing surface area. The illuminated marker has a nominal luminescence mode, a range of increased luminescence mode, maximum luminescence mode, and flashing mode. The illuminated marker operates in the nominal luminescence mode when the illuminated marker is positioned in an area of the viewing surface area that is determined to indicate optimal vehicle operating conditions. The illuminated marker operates in a range of increased luminescence mode when positioned in an area indicating changing vehicle operating conditions. When operating in the range of increased luminescence mode, the illuminated marker will begin to slowly brighten as the position of the illuminated marker moves toward the warning indicia through the range of increased luminescence mode. The illuminated marker will operate in a maximum luminescence mode when the illuminated marker is positioned in a caution zone area located at a predetermined distance from the warning indicia. The maximum luminescence mode is used to indicate that the vehicle operating conditions need attention soon. When the illuminated marker is positioned at or a predetermined distance from the warning indicia, the illuminated marker will operate in the flashing mode indicating that the vehicle operating conditions need immediate attention.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A is a partial plan front view of a vehicle instrument gauge being part of a vehicle instrument cluster;

FIG. 1B is a partial plan front view of a vehicle instrument gauge being part of a vehicle instrument cluster;

DETAILED DESCRIPTION OF THE PREFERRED EMBODIMENTS

The following description of the preferred embodiment(s) is merely exemplary in nature and is in no way intended to limit the invention, its application, or uses.

Figure 3:
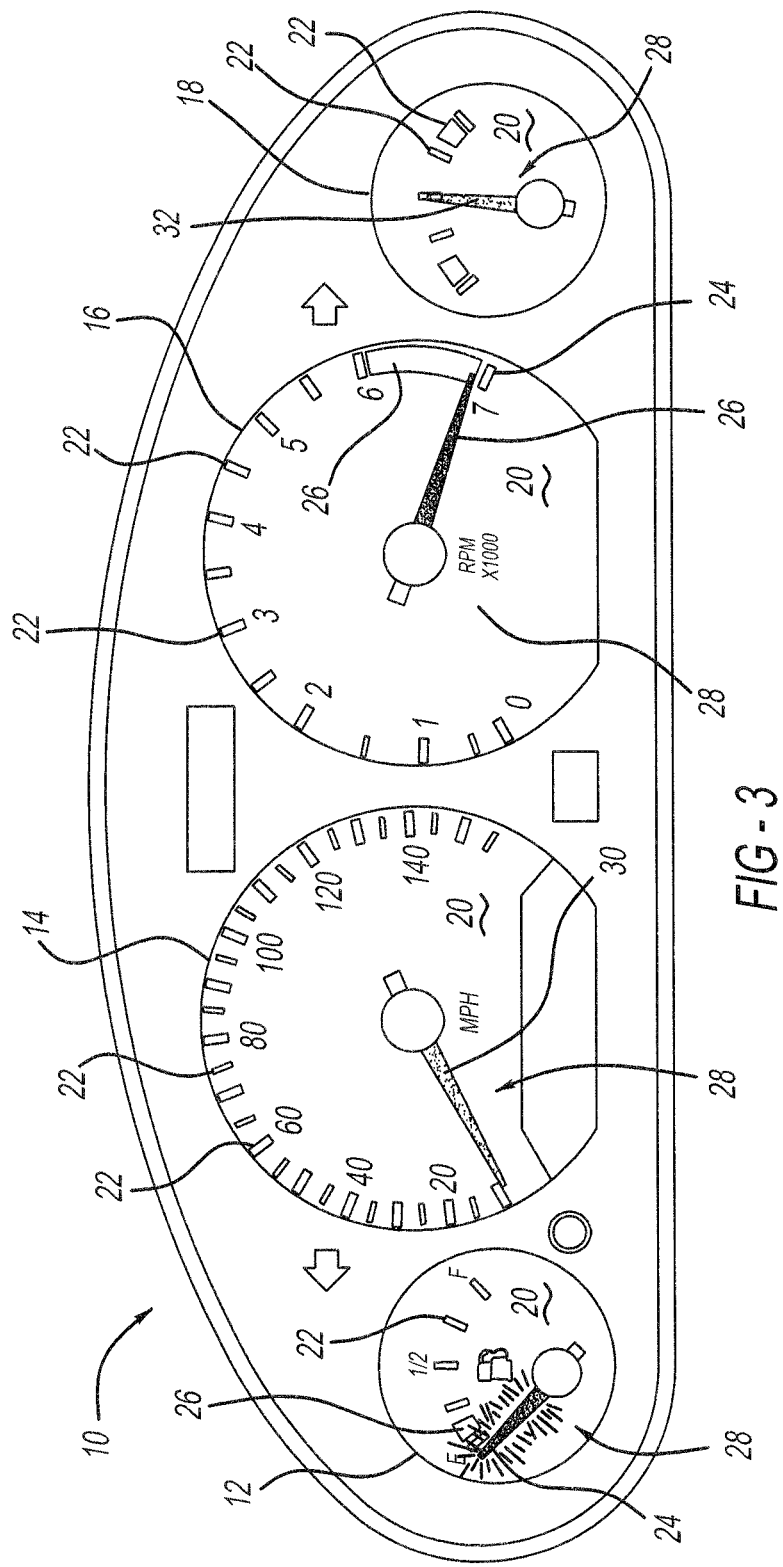
FIG. 3 is a front plan view of a vehicle instrument cluster.

Referring now to FIG. 3, a vehicle instrument cluster 10 is shown. The vehicle instrument cluster contains vehicle instrument gauges 12, 14, 16, 18, where vehicle instrument gauge 12 is a fuel gauge, vehicle instrument gauge 14 is a speedometer or a vehicle speed gauge, vehicle instrument gauge 16 is a tachometer, and vehicle instrument gauge 18 is a gauge representing another vehicle condition measurement and can be any number of desired gauges including an engine temperature gauge, oil pressure gauge, or battery voltage gauge. It is also within the scope of this invention for the vehicle instrument cluster 10 to include a lesser or greater number of gauges.

Each vehicle instrument gauge 12, 14, 16, 18 has a gauge surface area 20, which is a surface area viewable by a driver of a vehicle. The gauge surface area 20 contains two or more indicia 22 that relate to a range of values that the vehicle instrument gauge 12, 14, 16, 18 is measuring. Some of the vehicle instrument gauges 12, 16, include warning indicia 24 that indicates that the vehicle operating conditions needs immediate attention. For example, the vehicle instrument gauge 12, which is a fuel gauge, has a warning indicia 24 identified with the letter "E" indicating that the vehicle fuel level is near empty. The vehicle instrument gauge 16, which is a tachometer, has a warning indicia 24, that is commonly referred to as the "red zone", where the vehicle instrument gauge 16 indicates that the vehicle instrument engine RPMs are too high for the engine. In particular, the warning indicia 24 when used in connection with a vehicle instrument gauge 12, 14, 16, 18 indicates an area on the vehicle gauge surface 20 where vehicle operating conditions need immediate attention by the driver.

Figure 4:
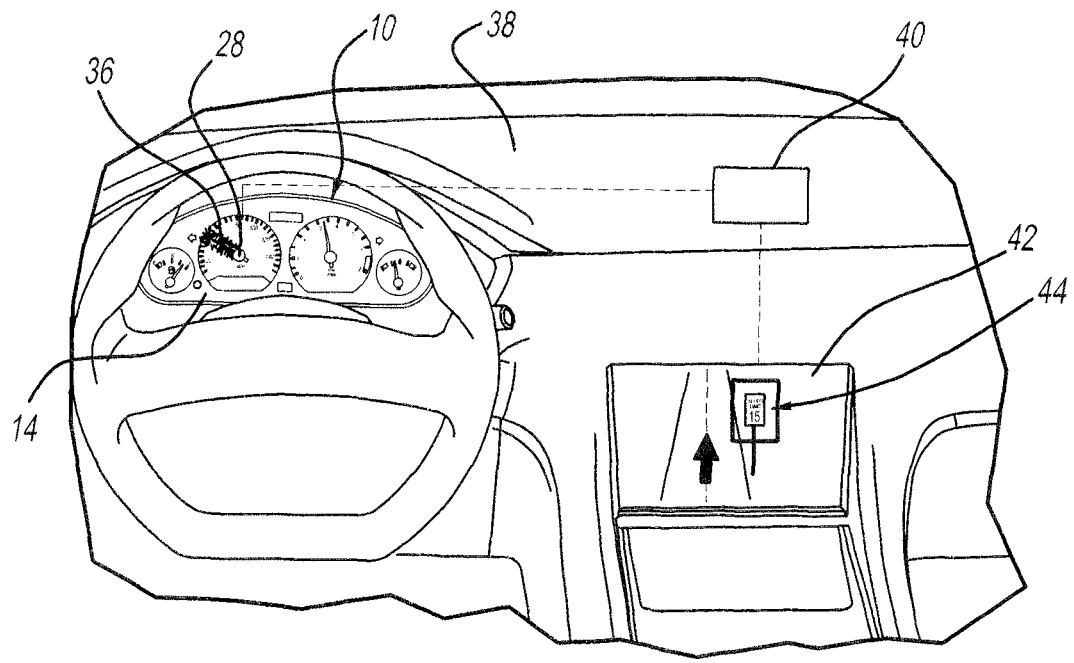
FIG. 4 is a partial front perspective view of a vehicle instrument panel with a vehicle instrument cluster and GPS display in accordance with an alternate embodiment of the present invention.

In addition to warning indicia 24, some of the vehicle instrument gauges 12, 16 have a caution zone 26 that indicates that the vehicle operating conditions need attention soon. While a caution zone 26 and warning indicia 24 are shown and described on vehicle instrument gauges 12, 16, it is within the scope of this invention for such warning indicia 24 and caution zone indicia 26 to not be present. For example, the vehicle instrument gauge 14, which is a speedometer, does not necessarily have a warning zone indicia 24 or caution zone indicia 26. Instead, in an alternate embodiment as shown in FIG. 4, the speedometer will include a different type of warning or caution indicators, which will be described later.

Figure 1C:
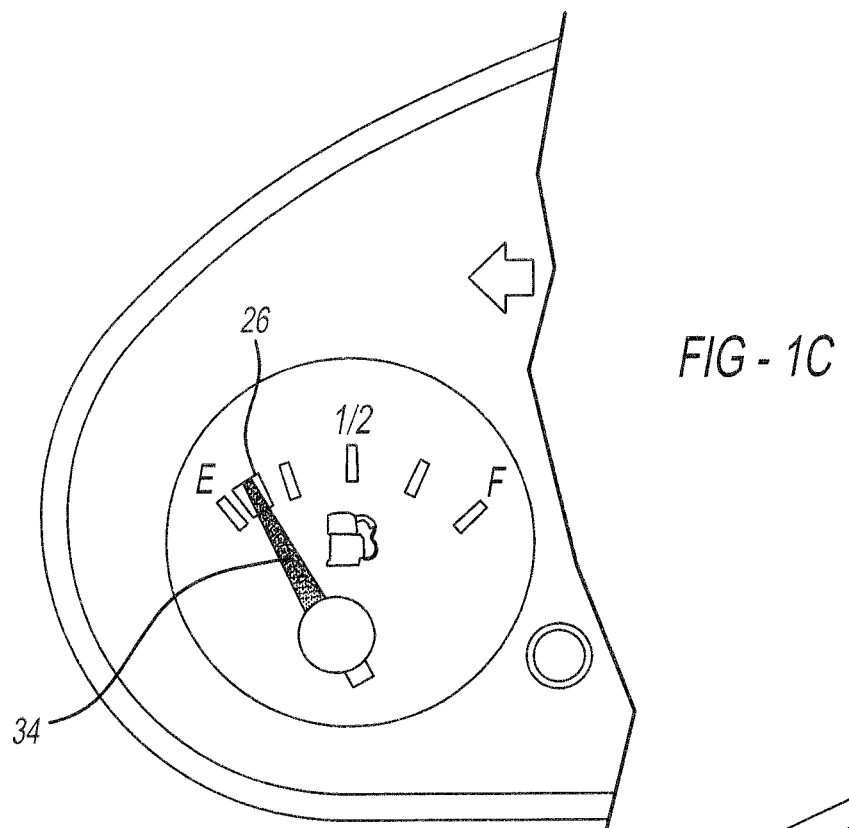
FIG. 1C is a partial plan front view of a vehicle instrument gauge being part of a vehicle instrument cluster.

Each of the instrument gauges 12, 14, 16, 18, have an illuminated marker 28. The illuminated marker as shown in FIGS. 1A, 1B, 10, 1D, 3, and 4 all have a pointer which is capable of being illuminated and functions as a light pipe from a receiving light from a light source. The illuminated marker 28 has a nominal luminescence mode 30 where the illuminated marker 28 exhibits a nominal amount of illumination or brightness when the illuminated marker 28 is located in an area indicating normal vehicle conditions for a vehicle instrument gauge. The illuminated marker 28 operating in nominal luminescence mode as shown in FIG. 1A, which is an embodiment showing a vehicle instrument gauge 12 that is a fuel level gauge.

When the illuminated marker 28 moves toward the empty fuel indicator, which is also referred to as the warning indicia 24, the illuminated marker will operate in a range of increased luminescence mode 32 where the illuminated marker will begin to slowly brighten as the position of the illuminated marker 28 moves toward the warning indicia 24 as the illuminated marker 28 moves through a range of increased luminescence 33 which is a preprogrammed range where the illuminated marker 28 will begin to brighten in an increased luminescence mode 32. The range of increased luminescence mode 32 is defined to be a certain predetermined range of values that is set for a specific vehicle instrument gauge.

Figure 1D:
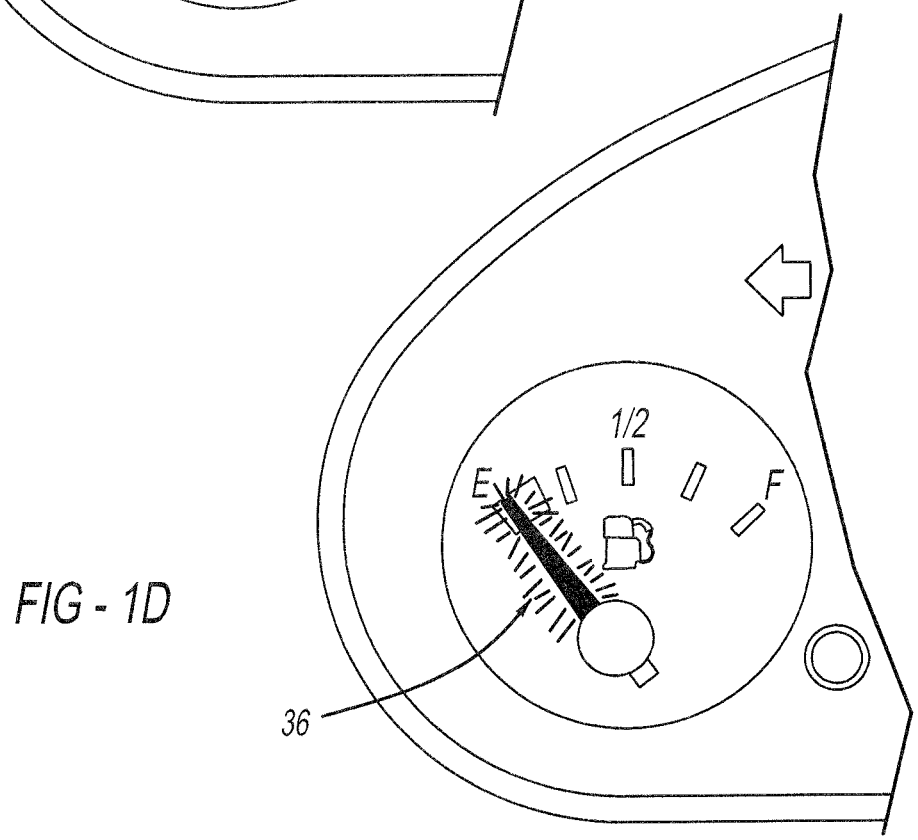
FIG. 1D is a partial plan front view of a vehicle instrument gauge being part of a vehicle instrument cluster.

After the illuminated marker 28 moves past the range of luminescence 33, the illuminated marker 28 will brighten to a maximum luminescence mode 34 where the illuminated marker 28 has reached a predetermined distance from the warning indicia 24. In the embodiment shown in FIG. 10, the illuminated marker 28 is operating in the maximum luminescence mode 34 because the illuminated marker is now located in the caution zone 26. In the embodiment shown in FIG. 10, this means that the vehicle fuel level is running low and needs attention. FIG. 1D shows the illuminated marker 28 operating in a flashing mode 36 where the illuminated marker is flashing on and off or between various levels of illumination to indicate that immediate attention is needed and that the illuminated marker 28 is at or very near the warning indicia 34, thereby indicating that the vehicle fuel level is almost empty.

The mode of operation for the illuminated marker 28 will be different depending on what vehicle instrument gauge 12, 14, 16, 18 the illuminated marker 28 is being used for. For example, the illuminated marker 28 may operate in the normal luminescence mode 30, range of increased luminescence mode 32, maximum luminescence mode 34, and flashing mode 36 at different times depending on the type of vehicle instrument gauge 12, 14, 16, 18 that the illuminated marker 28 is being used in connection with. FIG. 3 shows the vehicle fuel gauge operating in flashing mode 36, the tachometer 16 in maximum luminescence mode 34, speedometer 14 in normal luminescence mode 30, and gauge 18 in range of increased luminescence mode 32. It is also possible for the illuminated marker 28 to operate with only a nominal luminescence mode 30 and flashing mode 36 without also using a range of increased luminescence mode 32 or maximum luminescence mode 34. It is further within the scope of this invention for the illuminated marker 28 to not have a flashing mode 36, but instead have a nominal luminescence mode 30 and maximum luminescence mode 34, and/or a range of luminescence mode 32 and nominal luminescence mode 30. In other words, the illuminated marker can be programmed to have any different type of mode as described herein. It is also within the scope of this invention for the range of increased luminescence mode 32, maximum luminescence mode 34, and flashing mode 36 to be set at different points. For example, the illuminated marker 28 may operate in flashing mode 36 when the illuminated marker 28 reaches the caution zone 26 and without necessarily being located at or near the warning indicia 24. Also, the nominal luminescence mode 30 may be set so that the vehicle illuminated marker 28 only operates in the nominal luminescence mode 30 when the illuminated marker 28 is furthest away from the warning indicia 24, but will immediately begin operating in a range of increased luminescence mode 32 as the illuminated marker 28 moves toward the warning indicia 24. It is further within the scope of this invention for the warning indicia 24 to be set at a different point other than the end of the spectrum as shown in FIGS. 1A, 1B, 10, 1D.

Another example of the present invention being operated in different modes is shown in FIG. 4. FIG. 4 shows the vehicle instrument cluster 10 connected to a vehicle instrument panel 38. The vehicle instrument cluster 10 as shown in FIG. 4 has the vehicle instrument gauge 14, which is a speedometer connected to a controller 40. The controller 40 is also connected to and receives signals from a global positioning system or GPS 42. The GPS 42 is capable of determining the vehicles location and current vehicle speed 44. A signal sent from the GPS 42 to the controller 40 indicating what the current vehicle speed is for the location of the vehicle. The controller 40 then determines the current vehicle speed and compares it to the posted vehicle speed 44. If the vehicle is exceeding the posted vehicle speed 44, the controller may send a signal to the illuminated marker 28 causing the illuminated marker to operate in flashing mode 36 which draws attention to the fact that the current vehicle speed is exceeding the posted vehicle speed 44 for the vehicle's location. The controller 40 may instruct the illuminated marker 28 to operate in flashing mode 36 if the current vehicle speed exceeds the posted vehicle speed 44 or it may cause the illuminated marker 28 to operate in a maximum luminescence mode when the current vehicle speed matches the posted vehicle speed 44 or the illuminated marker 28 may begin operating in a normal luminescence mode when the vehicle is not moving and then as the illuminated marker 28 moves toward the posted vehicle speed 44, the illuminated marker 28 may operate in a range of increased luminescence mode where the illuminated marker 28 will begin to brighten over the range of luminescence until the illuminated marker 28 reaches the posted vehicle speed, where the controller 40 commands the illuminated marker 28 to operate in maximum luminescence mode. Then, if the vehicle speed exceeds the posted vehicle speed 44, the controller 40 may command the illuminated marker 28 to operate in flashing mode 36. It is within the scope of this invention for the vehicle instrument gauge 14 to operate in a variety of different modes depending on the settings of the controller.

Figure 2A:
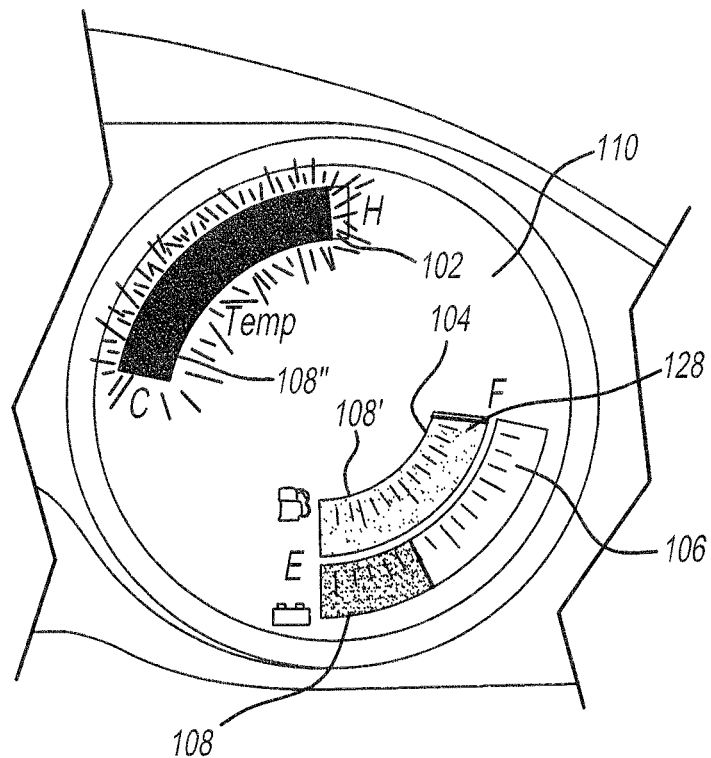
FIG. 2A is an alternate embodiment of the invention showing a vehicle instrument gauge that is part of a vehicle instrument cluster.
Figure 2B:
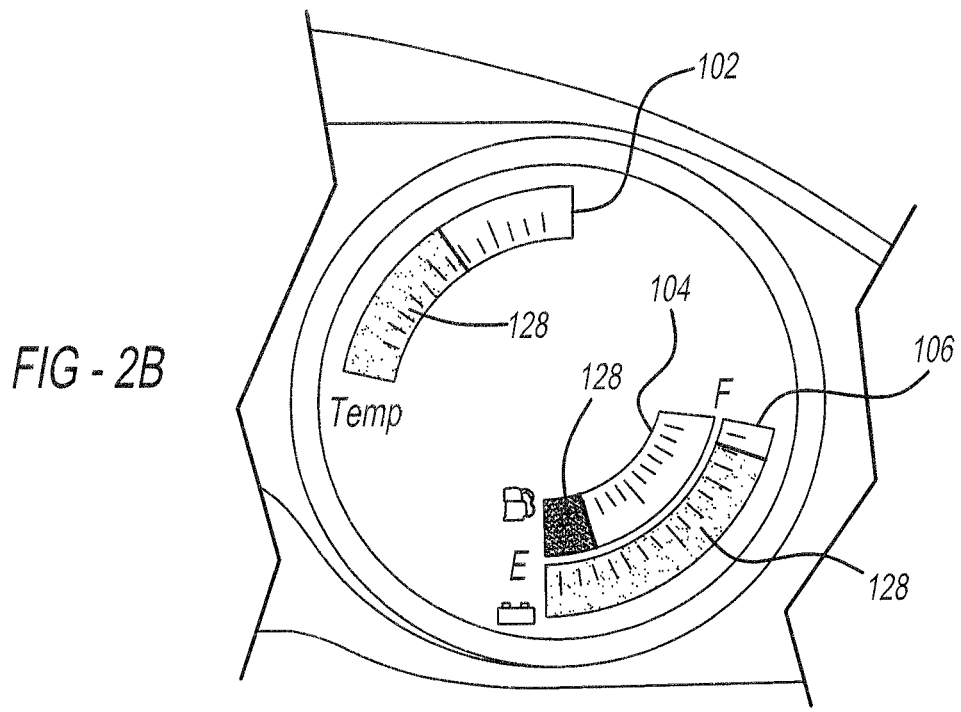
FIG. 2B is an alternate embodiment of the invention showing a vehicle instrument gauge that is part of a vehicle instrument cluster.

With regard to FIGS. 2A and 2B, an alternate embodiment of the invention is shown where the illuminated marker 28 or pointer is not used. Instead, a graphical illuminated marker 128 is used. In the present embodiment, the vehicle instrument cluster 110 is shown and contains several vehicle instrument gauges including a temperature gauge 102, fuel level gauge 104, and battery voltage gauge 106. Each of the gauges 102, 104, 106, has an electronic screen 108, 108', 108". The electronic screen 108, 108', 108" have an illuminated marker 128 that fills the entire electronic screen 108, 108', 108" in graphical manner. Vehicle fuel gauge 104 is shown operating in a nominal luminescence mode when the illuminated marker 128 is indicating a full tank of gas. The engine temperature gauge 102 is operating in flashing luminescence mode with the electronic screen 108" showing the temperature level being too hot for the engine conditions. The electronic screen 108' of the battery level gauge 106 is operating in a range of brightened luminescence indicating that the battery level will need attention soon. As shown in FIG. 2B, the fuel gauge 104 has an illuminated marker 128 that is operating in maximum luminescence mode indicating that the fuel level is getting low, the battery voltage gauge 106 is in normal luminescence showing that the illuminated marker 128 is located in a normal range.

Figure 5:
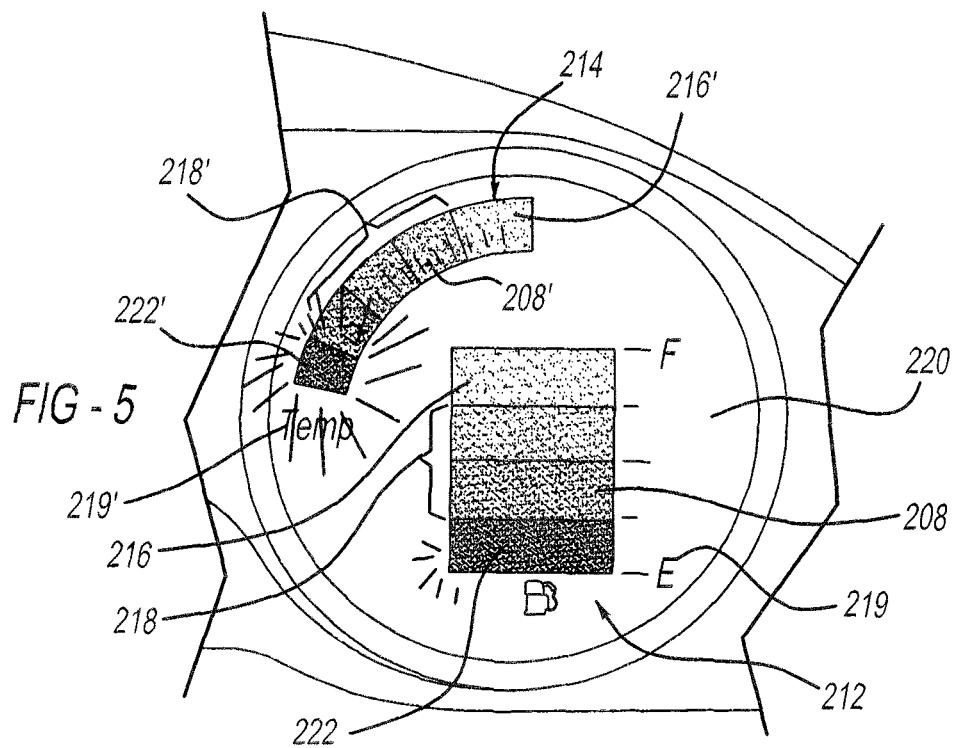
FIG. 5 is front plan view of a vehicle instrument gauge connected to a vehicle instrument cluster in accordance with an alternate embodiment of the present invention.

Referring now to FIG. 5, an alternate embodiment of the invention is shown where a vehicle instrument cluster 220 is shown having a vehicle fuel gauge 212 and vehicle temperature gauge 214. The vehicle fuel gauge 212 and vehicle temperature gauge 214 each have an electronic screen 208, 208' having several illuminated segments. The vehicle fuel gauge 212 and temperature gauge 214 have nominal luminescence segment 216, 216' that illuminate and indicate normal conditions. The fuel gauge 212 and temperature gauge 214 have a range of nominal luminescence 218, 218' that contains several segments of increased luminescence that will brighten as the engine conditions move toward a warning indicia, which in the present embodiment of the invention is a temperature indicia 219' or "E" indicia 219 which are the warning indicia for the gauges 212, 214. When the fuel gauge 212 and temperature gauge 214 levels need immediate attention and the fuel gauge 212 and temperature gauge 214 operate in a maximum luminescence mode 222, 222' where a segment of the electronic screen 208, 208' and the segment will begin operating in a flashing mode when immediate attention is needed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle instrument gauge with warning telltales comprising:
   a speedometer having a gauge surface area with said two or more indicia indicating various vehicle speeds and a warning indicia;
   an illuminated marker positionable between the two or more indicia on the viewing surface area, wherein said illuminated marker has a nominal luminescence mode, a range or increased luminescence mode, maximum luminescence mode, and flashing mode,
   a controller connected to said speedometer for controlling the position of said illuminated marker among said two or more indicia; and
   a GPS connected to said controller, wherein said GPS provides input to said controller that indicates the speed limit where the vehicle is currently driving, wherein said controller compares the speed limit information provided from the GPS with the vehicles current speed and causes said illuminated marker to operate in a maximum luminescence mode when the current vehicle speed matches the posted vehicle speed and the illuminated marker operates in a normal luminescence mode when the vehicle is not moving and then as the illuminated marker move toward the posted vehicle speed, the illuminated marker operates in a range of increased luminescence mode where the illuminated marker will begin to brighten over the range of luminescence until the illuminated marker reaches the posted vehicle speed, where the controller commands the illuminated marker to operate in maximum luminescence mode, and the controller will command the illuminated marker to operate in flashing mode if the vehicle speed exceeds the posted vehicle speed.

2. The instrument gauge of claim 1 wherein said illuminated marker is a rotatable pointer that is rotatable between said two or more indicia.

3. The instrument gauge of claim 1 wherein said illuminated marker is an electronic screen having illuminated segments on the electronic screen that indicate the position of the illuminated marker.

4. An instrument cluster with warning telltales comprising:
   two or more vehicle instrument gauges, each having warning telltales, wherein each one of said two or more vehicle instrument gauges has a gauge surface area with two or more indicia on a viewing surface area, wherein one of said two or more vehicle instrument gauges is a speedometer and said two or more indicia indicate various vehicle speeds and both of said two or more vehicle instrument gauges include a warning indicia;
   each gauge having an illuminated marker positionable between the respective two or more indicia on the viewing surface area, wherein said illuminated marker has a nominal luminescence mode, such that said illuminated marker operates in the nominal luminescence mode when said illuminated marker is positioned in an area of said viewing surface area that is determined to indicate optimum vehicle operating conditions, said illuminated marker operates in a range of increase luminescence mode when positioned in an area indicating changing vehicle operating conditions and the illuminated marker will begin to slowly brighten as the position of said illuminated marker moves toward said warning indicia, and said illuminated marker will operate in the maximum luminescence mode when said illuminated marker is positioned in a caution zone area located at a predetermined distance from said warning indicia indicating that the vehicle operating condition needs attention soon, and said illuminated marker will flash when said illuminated marker is positioned at a predetermined distance from said warning indicia;
   a controller connected with each one of said two or more vehicle instrument gauges, wherein said controller sends independent control signals to each one of said two or more vehicle instrument gauges causing each illuminated marker of each one of said two or more vehicle instrument gauges to illuminate in a specific one of said nominal luminescence mode, range of increased luminescence mode, maximum luminescence mode, or flashing mode;

a controller connected to said speedometer for controlling the position of said illuminated marker among said two or more indicia; and a GPS connected to said controller, wherein said GPS provides input to said controller that indicates the speed limit where the vehicle is currently driving, wherein said controller compares the speed limit information provided from the GPS with the vehicles current speed and causes said illuminated marker to move from the nominal luminescence mode to the flashing mode when the vehicle speed exceeds the posted vehicle speed limit.

5. The vehicle instrument cluster of claim 4 wherein each said illuminated marker is a rotatable pointer that is rotatable between said two or more indicia.

6. The vehicle instrument cluster of claim 4 wherein each said illuminated marker is an electronic screen having illuminated segments on the electronic screen that indicate the position of the illuminated marker.

7. The vehicle instrument cluster of claim 4 wherein as said illuminated marker moves further toward the warning indicia, the illuminated marker will begin flashing once it reaches a warning zone area that is a predetermined distance from said warning indicia.

* * * * *